United States Patent [19]
Rogers et al.

[11] Patent Number: 6,023,582
[45] Date of Patent: *Feb. 8, 2000

[54] FUNCTION CODE CHAINING METHOD

[75] Inventors: Norman L. Rogers, Davis; Tak Y. Auyeung, Sacramento, both of Calif.

[73] Assignee: Z-World, Inc., Davis, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,480

[22] Filed: Dec. 23, 1996

[51] Int. Cl.⁷ ....................................................... G06F 9/44
[52] U.S. Cl. .......................... 395/708; 395/705; 395/707; 395/710
[58] Field of Search ..................................... 395/710, 680, 395/670, 684, 685, 708, 705, 707, 701, 702, 703, 704, 706, 709; 707/100–103; 364/262.5, 280.4, 946.3

[56] References Cited

U.S. PATENT DOCUMENTS

| | | | |
|---|---|---|---|
| 5,375,241 | 12/1994 | Walsh | 395/685 |
| 5,504,901 | 4/1996 | Peterson | 395/710 |
| 5,613,117 | 3/1997 | Davidson et al. | 395/708 |
| 5,625,822 | 4/1997 | Brett | 395/710 |

OTHER PUBLICATIONS

Inprise Corporation, "SEGMENT Ideal, MASM", TASM32.HLP from Borland C++ Builder 4.0 distribution, 1988.

Hayashida et al., Optimizing Method of C Compiler for TRON Architecture, IEEE, TRON Project, 1992 Symposium, pp. 70–76 (No Date With Month).

*Primary Examiner*—Tariq R. Hafiz
*Assistant Examiner*—Todd Ingberg
*Attorney, Agent, or Firm*—John P. O'Banion

[57] ABSTRACT

A computer language construct for connecting related but independent routines at compile time. The computer language construct allows the creation of symbolic "chains", which can be called at run time. Individual functions and code fragments, written in a high level programming language, can be attached to the chains. When a symbolic chain is called, all the functions and code fragments attached to it will also be called. The definition of a symbolic chain and each function or code fragment attached to it are all independent. Chains can also be organized hierarchically, and a chain can be attached to another chain.

13 Claims, 4 Drawing Sheets

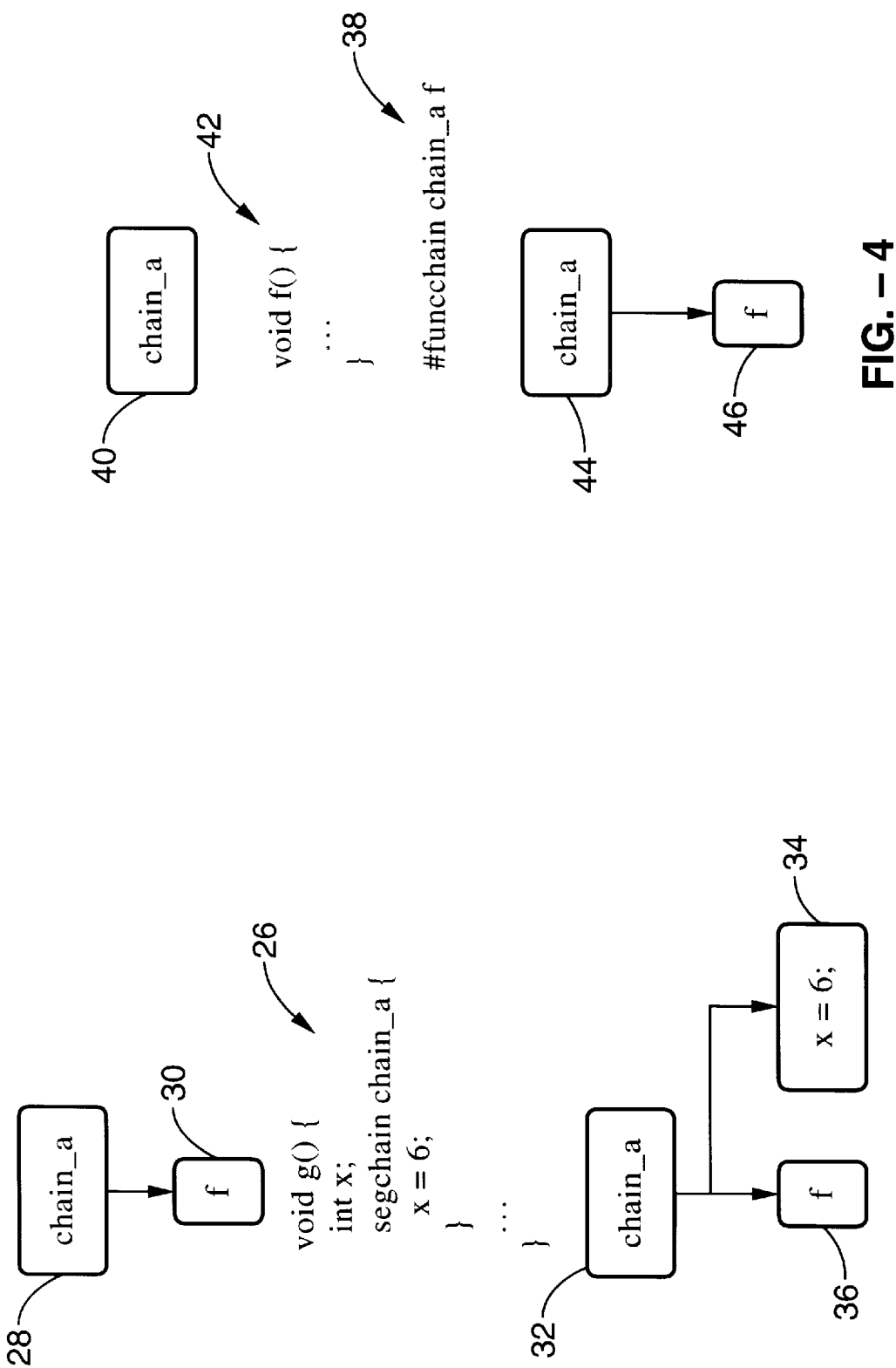

FUNCTION CODE CHAINING METHOD

BACKGROUND OF THE INVENTION

1. Field of the Invention

This invention pertains generally to invoking run-time routines in computer programming languages, and more particularly to a method for linking related run-time routines to functional modules or "chains".

2. Description of the Background Art

In existing programming languages, including the "C" programming language, there is no provision for linking routines that are independently compiled but need to be called at the same point. For example, a computer (or embedded controller) may reset due to a power failure, a deliberate reset, or a system crash. At the startup code of the controller program, each component of the controller hardware (for example, the LCD, keypad, digital I/O and analog I/O) may need to execute different routines to restore external devices from a power failure, to reinitialize system parameters for a deliberate reset, or to record the crash time and date for a system crash.

In order to perform the above reset operation in a conventional high level programming language, the programmer must be aware of all the components being used, and call the correct reset handling routine for each possible cause of reset. This is a problem for three major reasons. First, a component may be implicitly used by another component. As a result, the programmer may not be aware of the usage of the implicit component and, therefore, not call the reset handling routines of the implicit component. Second, the programmer needs to explicitly relate the cause of reset to the handler routines, leaving much room for mistake. Third, because the decision to call reset handling routines depends on the components used, it is impossible to define a system routine to perform the conditional calls.

Therefore, there is a need for a programming language construct and method of use that reverses the responsibilities of the application programmer to the library programmers and provides for chaining related run-time routines so that the programmer need only call a function in order to execute a related routines. The "function code chaining" language construct and method of use in accordance with the present invention satisfies that need, as well as others, and overcomes the deficiencies in previously known techniques.

SUMMARY OF THE INVENTION

The present invention generally comprises three language constructs for high level programming languages and a method of interrelating those constructs to provide for "function chaining" of related run-time routines for common execution in response to a single command or call within the programming language.

By way of example, and not of limitation, the first construct provides for defining a symbolic chain; the second construct provides for defining code fragments within functions or procedures and attaching those defined fragments to the symbolic chain; and the third construct provides for attaching a function or procedure to the symbolic chain. The three language constructs of the present invention are implemented in a function chaining method of linking related run-time routines from different functional modules which are executed on a computer or computer-based controller. The constructs are integrated into the high level programming language, which is stored on internal or external media such as disk drives or the like, or which is loaded into or resident in random access memory, firmware or the like. The programming language is used in a conventional manner to develop instructions for operation of the computer at a high level, and the resulting program is then compiled into machine language for execution on the computer or computer-based controller.

When programming a computer, the programmer typically selects certain run-time routines from software libraries and specifies at what point those routines are to be executed. The selection of routines is performed within any high-level language in which the programmer enters instructions which are compiled or interpreted into a set of machine code. These routines would normally be called explicitly and individually, even though several of the routines may be related a common function, such as power-up initialization. On the other hand, the programmer may only be using the software libraries indirectly and not be aware of the necessity to call particular routines in the libraries. In accordance with the present invention, however, if the programmer desires to invoke power-up initialization, for example, the programmer would simply call a power-up initialization function, which would in turn invoke all related run-time routines on execution. Therefore the creator of the programming language or library would be responsible for linking the related run-time routines for power-up initialization, and the programmer would not need to call routines individually. Any related run-time routines could be linked in to a commonly defined function call so that the programmer would not need to determine which routines to call individually.

An object of the invention is to link related run-time routines in a high level programming language.

Another object of the invention is to provide for execution of related run-time routines from a single function call.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

FIG. 3 illustrates segment chaining with of a function and a fragment.

FIG. 4 illustrates the #funcchain construct in which "chain_a" invokes function "f".

DESCRIPTION OF THE PREFERRED EMBODIMENTS

Referring more specifically to the drawings, for illustrative purposes the language constructs embodied in the present invention are generally shown in FIG. 1 through FIG. 7. For the convenience of discussion herein, the "C" programming language is used as an example of a high level programming language for the illustration of the language constructs and method of use in accordance with the present invention. However, the present invention is equally applicable to other high level programming languages. The invention links a plurality of related run-time routines to a callable chain for execution from a single call to the chain. These routines can include independently callable functions or code segments or the like. As used herein, the terms "routines", "functions" and "code segments" have their ordinary meanings in the programming arts and their equivalents unless otherwise specially defined.

1. Construct Definitions.

The present invention comprises a plurality of language constructs as defined below. Those skilled in the art will readily appreciate from the discussion herein how to incorporate these constructs into a high level programming language. Those skilled in the art will also appreciate that the names or labels assigned to these constructs, as well as their specific syntax, can vary without departing from the invention described herein, and that the syntax and keywords used below were chosen to be consistent with the "C" programming language used herein for illustration purposes.

1.1 Chain Declaration

Figure 1:
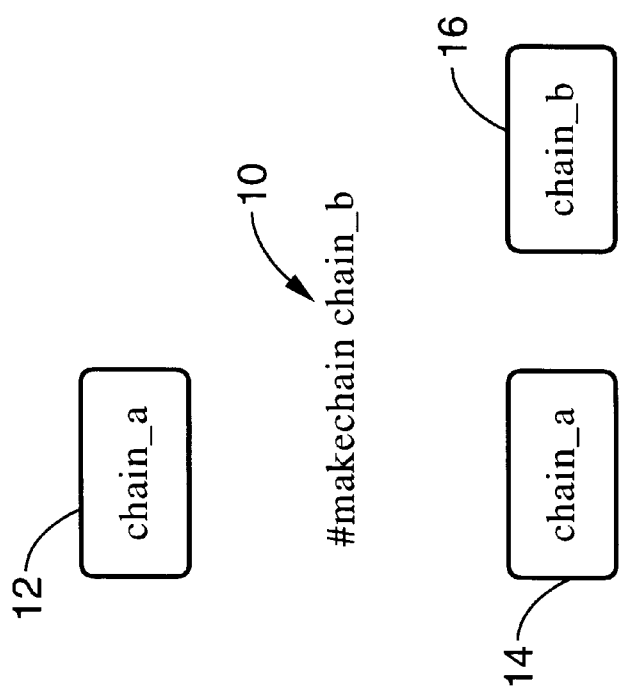
FIG. 1 illustrates the #makechain construct creating "chain_b".

A symbolic chain is declared by a compile-time construct. For notational convenience, we shall use the following language construct to designate a chain definition:

makechain<chainname>  (1)

where <chainname> is a programmer-defined symbolic name that represents the chain. FIG. 1 illustrates the use of a #makechain code section 10 wherein "chain_a" 12 already exists before the #makechain statement 10 which creates a new chain, "chain_b" 16 which now exists with "chain_a" 14. Once a chain is declared, it can be called as a regular function or procedure.

1.2 Code Fragment Attachment

Figure 2:
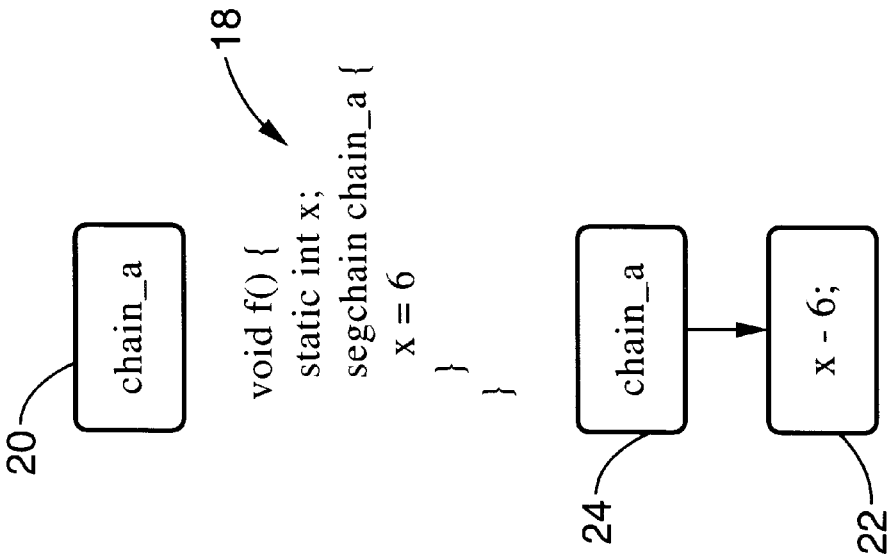
FIG. 2 illustrates the segchain construct inside a function invoked by "chain_a".

A code fragment is defined by a special statement in a regular function or procedure. The statement also attaches the code fragment to a declared chain. The code in the code fragment has access to all local symbols defined in the containing function or procedure. The syntax of the statement is as follows:

segchain<chainname>{<statements>}  (2)

where <chainname> is the name of a declared chain, and <statements> replaced by the actual statements. This syntactic construct specifies that when the chain <chainname> is called, the statements replacing <statements> will be executed. FIG. 2 illustrates a segchain code section 18, in which "chain_a" 20 exists and to which the fragment illustrated by the statement "x=6;" 22, is invoked by "chain_a" 24. FIG. 3 illustrates the use of segchain code 26, in which "chain_a" 28 invokes function "f" 30, before the function definition of "g" (not shown) that contains a fragment. The segchain code via "chain_a" 32 invokes the fragment represented by the statement "x=6;" 34 in function "g" as well as the function "f" 36 as already defined.

1.3 Function Attachment

Figure 6:
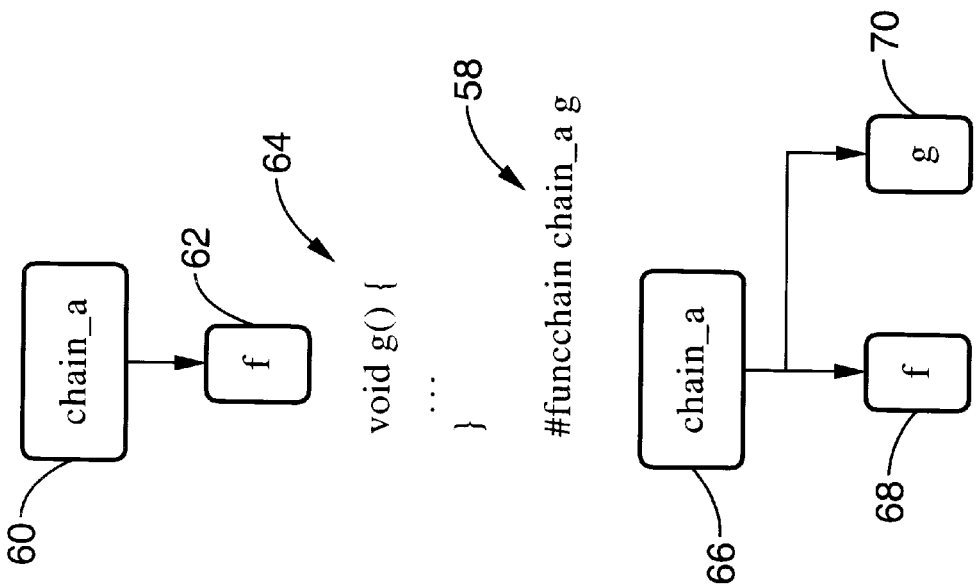
FIG. 6 illustrates the linking of independently callable routines.
Figure 5:
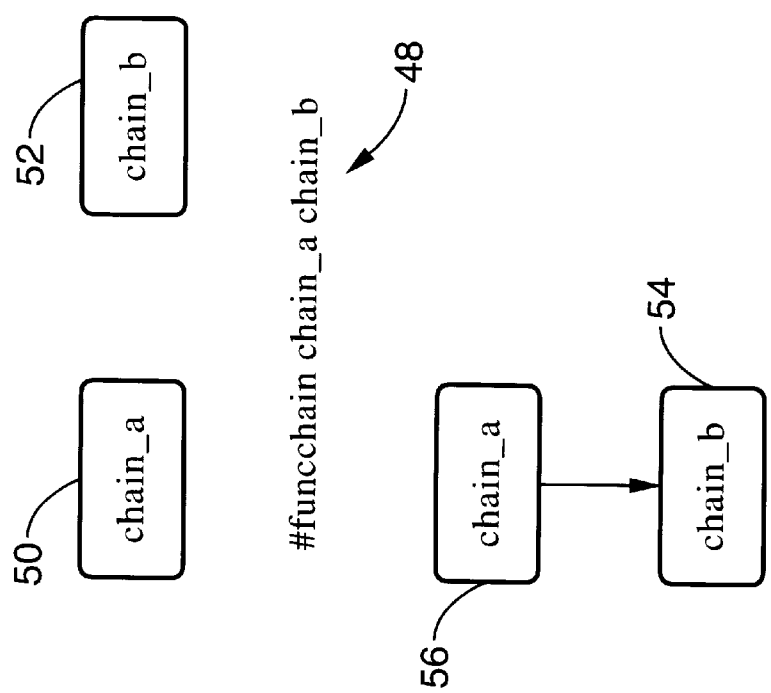
FIG. 5 illustrates the #makechain construct in which "chain_a" invokes the new "chain_b".
Figure 7:
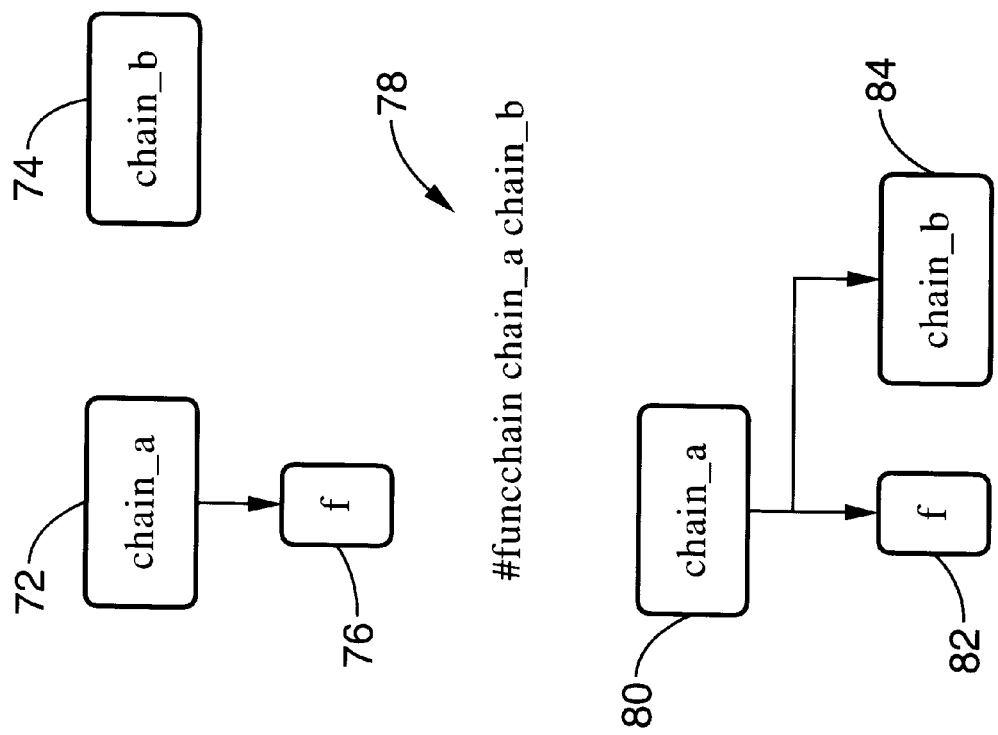
FIG. 7 illustrates attaching a second chain to a first chain.

A function or procedure is attached to a chain via the following syntax:

funcchain<chainname><funcname>  (3)

where <chainname> is the name of a declared chain and <funcname> is the symbolic name of a function or procedure. This syntactic construct specifies that when chain <chainname> is called, the function or procedure <funcname> will be called as well. FIG. 4 illustrates a code section with #funcchain 38, in which "chain_a" 40, exists before the function definition of "f( )" 42, and #funcchain causes "chain_a" 44 to invoke function "f" 46. FIG. 5 illustrates the use of #funcchain in a section of code 48, in which "chain_a" 50 and "chain_b" 52 already exist before the #funcchain statement 48 that causes "chain_b" 54 to be invoked by "chain_a" 56. FIG. 6 illustrates the use of #funcchain coding 58 in which "chain_a" 60 already exists and is invoking function "f" 62 before the function definition of "g" 64. The #funcchain statement causes "chain_a" 66 to invoke both function "f" 68 and function "g" 70. In FIG. 7 "chain_a" 72 and "chain_b" 74 already exist with "chain_a" 72 invoking function "f" 76 before the #funcchain statement 78. After the #funcchain statement, "chain_a" 80 invokes both function "f" 82 and chain "chain_b" 84.

1.4 Chain Calling

A chain is called as a regular function or procedure in the high level language program. In the case of the "C" programming language, the chain will be invoked by the following syntax:

<chainname>( );

wherein <chainname> is the name of a declared chain. This syntactic construct will invoke the chain, which will in turn invoke all the code fragments and functions attached to this chain.

2. Method of the Present Invention.

The constructs defined above are implemented in a high level programming language in accordance with the following steps which are for illustrative purposes. Those skilled in the art will appreciate that the method may vary as to the steps and their sequence without departing from the present invention.

2.1 Chain Declaration

Referring to definition (1) above for the syntax, the language compiler adds the symbolic chain name <chainname> to an internal table when this language construct is encountered, and records that this symbol refers to a chain. The list of starting addresses associated with the chain is also initialized.

2.2 Code Fragment Attachment

Referring to definition (2) above for the syntax, the compiler records the starting address of the code fragment <statements> and inserts an implicit return at the end of <statements>. The starting address is added to a list of starting addresses associated with the specified chain <chainname>.

2.3 Function Attachment

Referring to definition (3) above for the syntax, the compiler adds the starting address of the specified function <funcname> to the list of starting address associated with the specified chain <chainname>.

2.4 Compiler Output

If the high level language supports multiple modules, the compiler maintains the lists of starting addresses associated with all declared chains in the compiled module representation.

2.5 Linker Action

For each declared chain, a linker takes all specified compiled modules, concatenates the lists of starting addresses associated to the chain, generates a sequence of calls to each starting address, and appends a return at the end of the call sequence. The now-known address of the chain will then be used to resolve call references to the chain. If the high level language does not support multiple modules, it becomes a special case of having one and only one module.

EXAMPLE 1

Consider the following complete program (in the "C" programming language) which illustrates the present invention:

```
#include<stdio.h>
#makechain a
#makechain b
#makechain c
void f(){printf("x");}
void g(){printf("y");}
void h(){segchain c{printf("z");}
       printf("w");
}
#funcchain a f
#funcchain a h
#funcchain b g
#funcchain c a
int main(){
a();
b();
c();
return 0;
}
```

One of the correct outputs of this program would be as follows:

xwyzxw

This is one of the correct outputs because the order of execution of functions and code fragments in the same chain is not specified. Another possible output of the previous program is therefore as follows:

wxywxz

Let us track the execution trace that leads to the output "xwyzxw". The execution sequence is summarized as follows:

(1) main calls chain a
(2) chain a calls function f, which is attached by "#funcchain a f", function f prints x"
(3) chain a then calls function h, which is attached by "#funcchain a h", function h prints "w"
(4) back to main, chain b calls function g, which is attached by "#funcchain b g", function g prints "y"
(5) back to main, chain c calls the fragment in function h, attached by "segchain c {. . . }", the code fragment prints "z"
(6) chain c calls chain a
(7) chain a calls function f, which is attached by "#funcchain a f", function f prints x"
(8) chain a then calls function h, which is attached by "#funcchain a h", function h prints "w"
(9) back to chain c
(10) back to main, execution completes Accordingly, it will be seen that this invention provides for linking related run-time routines and executing those routines from a single call to the chain. Since the chain can be called as a function or procedure itself, the programmer does not need to make independent calls to the routines or code fragments to be executed. Furthermore, chains can be attached or linked to each other.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A function chaining method for a programming language executable on a computer, comprising the steps of:
    (a) defining a chain having a symbolic entry point; and
    (b) attaching at least one section of program code to said chain;
    (c) wherein said computer executes said section of program code when said chain is called in said programming language and wherein said section of program code comprises a code fragment and said code fragment is attached at any point in a source code to said chain according to the language construct segchain<chainname>{<statements>} where segchain is a representative symbolic name chosen arbitrarily to represent a code fragment attachment command, where <chainname> is a symbolic name representation of the chain, and where <statements> is replaced by an actual code fragment to be attached, and wherein a code fragment replacing <statements> will be executed when the chain <chainname> is called.

2. A method as recited in claim 1, further comprising the step of calling said chain in said program.

3. A method as recited in claim 1, further comprising the step of attaching at least one additional chain to said chain without referring to these additional chains at the programmatic location where said chain is called.

4. A method according to claim 1, wherein said chain is invoked by calling

<chainname>( )

within said programming language.

5. A method of linking independently callable code sections in a programming language executable on a computer, comprising the steps of:
    (a) defining a chain having a symbolic entry point; and
    (b) attaching a plurality of independently callable program code sections to said chain, wherein said section of program code need not be sequentially located with addresses at which said chain was defined;
    (c) wherein said program code sections are executed in an ordered sequence on said computer by calling said chain in said programming language wherein said program code section comprises a code fragment and said code fragment is attached to said chain according to the language construct segchain<chainname>{<statements>} where segchain is a representative symbolic name chosen arbitrarily to represent a code fragment attachment command, where <chainname> is a symbolic name that represents the chain, and where <statements> is replaced by an actual code fragment to be attached, and wherein a code fragment replacing <statements> will be executed when the chain <chainname> is called, whereby the ordered sequence of fragment execution on the chain links the functionality of each fragment to one another in the chain.

6. A method as recited in claim 5, further comprising the step of attaching a second chain to said chain.

7. A method according to claim 5, wherein said chain is invoked by calling

<chainname>( )

within said high level programming language.

8. A method of linking and executing independently callable code sections in a programming language executable on a computer, comprising the steps of:

(a) defining a chain having a symbolic entry point; and (b) attaching a plurality of independently callable program code sections to said chain, and;

(c) calling said chain in said programming language wherein said computer executes said callable program code sections in an ordered sequence when said chain is called in said programming language wherein said code section comprises a code fragment and said code fragment is attached to said chain according to the language construct segchain<chainname>{<statements>} where segchain is a representative symbolic name chosen arbitrarily to represent a code fragment attachment command, where <chainname> is a symbolic name that represents the chain, and where <statements> is replaced by an actual code fragment to be attached, and wherein a code fragment replacing <statements> will be executed when the chain <chainname> is called, whereby the ordered sequence of fragment execution on the chain links the functionality of each fragment to one another in the chain.

9. A method as recited in claim 8, further comprising the step of attaching a second chain to said chain.

10. A method according to claim 8, wherein said chain is invoked by calling

<chainname>( )

within said high level programming language.

11. A function chaining method for a high level programming language executable on a computer, comprising the steps of:

(a) defining a chain having a symbolic entry point; and (b) attaching a plurality of executable routines to said chain;

(c) wherein said computer executes said executable routines when said chain is called in said high level programming language, wherein each said routine comprises a code fragment attached to said chain according to the language construct segchain<chainname>{<statements>} where segchain is a symbolic name that represents a code fragment attachment command, where <chainname> is a symbolic name that represents the chain, and where <statements> is replaced by an actual code fragment to be attached, and wherein a code fragment replacing <statements> will be executed when the chain <chainname> is called.

12. A method of linking independently callable routines in a high level programming language executable on a computer, comprising the steps of:

(a) defining a chain having a symbolic entry point; and (b) attaching a plurality of independently callable routines to said chain;

(c) wherein said routines are executed on said computer by calling said chain in said high level language program wherein each said routine comprises a code fragment attached to said chain according to the language construct segchain<chainname>{<statements>} where segchain is a symbolic name that represents a code fragment attachment command, where <chainname> is a symbolic name that represents the chain, and where <statements> is replaced by an actual code fragment to be attached, and wherein a code fragment replacing <statements> will be executed when the chain <chainname> is called.

13. A method of linking and executing independently callable routines in a high level programming language executable on a computer, comprising the steps of:

(a) defining a chain having a symbolic entry point; and (b) attaching a plurality of independently callable routines to said chain, and;

(c) calling said chain in said high level language program wherein said computer executes said callable routines when said chain is called in said high level programming language wherein each said routine comprises a code fragment attached to said chain according to the language construct segchain<chainname>{<statements>} where segchain is a symbolic name that represents a code fragment attachment command, where <chainname> is a symbolic name that represents the chain, and where <statements> is replaced by an actual code fragment to be attached, and wherein a code fragment replacing <statements> will be executed when the chain <chainname> is called.

\* \* \* \* \*